May 8, 1962 A. J. SNYGG 3,034,038
CONTROL APPARATUS
Filed June 23, 1959 2 Sheets-Sheet 1

INVENTOR.
ARNOLD J. SNYGG
BY
ATTORNEY

May 8, 1962  A. J. SNYGG  3,034,038
CONTROL APPARATUS

Filed June 23, 1959  2 Sheets-Sheet 2

INVENTOR.
ARNOLD J. SNYGG
BY
ATTORNEY

United States Patent Office 3,034,038
Patented May 8, 1962

3,034,038
CONTROL APPARATUS
Arnold J. Snygg, White Bear, Minn., assignor to Minneapolis-Honeywell Regulator Company, Minneapolis, Minn., a corporation of Delaware
Filed June 23, 1959, Ser. No. 822,338
8 Claims. (Cl. 323—89)

This invention relates to control apparatus and more particularly to electric signal characterizing apparatus whereby a characteristic of an output signal is varied according to a desired function of an input signal characteristic.

A frequent requirement in the control art is to obtain a signal that varies in a predetermined non-linear manner with another signal. The desired relation between these signals in some cases may be a simple trigonometric function, while in other cases the desired relation may be a highly complicated function determined empirically.

Heretofore, one type of apparatus for producing characterized signals frequently utilized characterized potentiometers. In such an arrangement the mechanical input to the potentiometer is controlled by the input signal through a servo device, and the output signal varies according to the characterization of the potentiometer winding. Another similar scheme for producing characterized signals employs a linear potentiometer and a characterized cam. The potentiometer's mechanical input varies according to the characterization of the cam, and the output signal therefore varies according to the characterization of the cam, which is controlled by the input signal through servo means or the like.

While signal characterizers that employ potentiometers, cams, and other mechanical contrivances operate satisfactorily in some cases, they are subject to mechanical wear and accompanying inaccuracies and are almost invariably a source of great difficulty in apparatus subjected to severe environmental conditions such as mechanical vibration, shock, and extreme accelerations. My invention, however, uses no moving parts and thereby avoids these difficulties.

My invention, briefly, comprises a saturable magnetic core having an output winding, a plurality of control windings and suitable bias winding means; a further circuit comprising a plurality of Zener diodes, or the like, selectively applies input current to the control windings so as to vary the saturation of the core in a predetermined manner. In this way, the reactance of the control winding is varied according to the desired function of the input signal, and current flowing through the output winding, which is connected in series with an alternating current source and an output impedance means, varies in the desired manner with the input signal.

It is a main object of my invention to provide signal characterizing apparatus having no moving parts and capable of producing an output signal according to a desired function of an input signal.

It is a further object of my invention to provide signal characterizing apparatus having no moving parts and producing as an output signal an alternating current signal that varies in magnitude according to a desired function of a direct current input signal.

It is another object of the present invention to provide a reactance device that changes its permeability smoothly in response to an input control signal.

Figure 1:
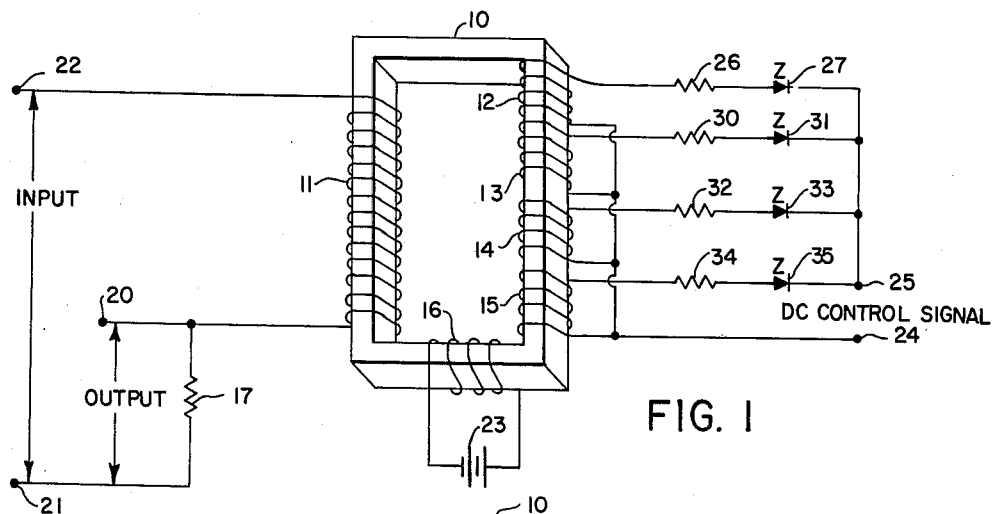
FIGURE 1 is a schematic diagram of a signal characterizer embodying my invention.

These and other objects of my invention will be more readily understood upon consideration of the accompanying specification, claims, and drawings, of which:

Structure of FIGURE 1

In FIGURE 1, a magnetic core 10 has wound about it an output winding 11, four control windings 12, 13, 14 and 15, and a bias winding 16. An impedance 17 is connected between a terminal 20 and another terminal 21. Output winding 11 is connected between terminal 20 and a further terminal 22. Terminals 21 and 22 serve as voltage input terminals, to which is applied an alternating current signal (by means not shown). Terminals 20 and 21 serve as output signal terminals.

Bias winding 16 is connected to a unidirectional bias current source 23 so as to bias core 10 to the desired magnetic operating point.

The lower ends of control windings 12, 13, 14 and 15 are each connected directly to a control signal terminal 24. The upper end of control winding 12 is connected to another input signal terminal 25 through the series combination of a resistor 26 and a Zener diode 27. Zener diode 27, and the others appearing throughout the figures, are represented by the conventional diode symbol Z. The upper end of control winding 13 is connected to terminal 25 through the series combination of a resistor 30 and a Zener diode 31. Likewise, the upper end of control winding 14 is connected to terminal 25 through a resistor 32 and a Zener diode 33, and the upper end of control winding 15 is connected to terminal 25 through a resistor 34 and a Zener diode 35.

Operation of FIGURE 1

Figure 3:
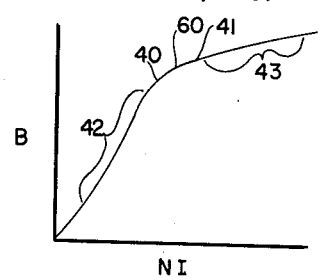
FIGURE 3 is a characteristic curve of suitable magnetic core material.

The material of which core 10 is made has a magnetic characteristic of the general type shown in FIGURE 3. As seen in FIGURE 3, increasing magnetomotive force, NI, causes increasing flux density, B, until the knee of the curve is reached. The knee of this curve may be described as that portion between the points designated 40 and 41, numeral 40 referring to the lower extreme of the knee and numeral 41 referring to the upper extreme of the knee. At flux densities lower than that at point 40, the change in flux density for a given change in magnetomotive force is fairly linear, as may be seen by noting the relatively straight portion of the curve designated 42. Likewise, for flux densities greater than that at point 41 the curve is again almost linear; this region is designated with numeral 43. The slope of region 42 is much greater than the slope of region 43, for over region 42 the magnetic material is unsaturated while over region 43 the magnetic material is completely saturated and the slope is therefore essentially the same as that obtained in an air core conductor. The region between points 40 and 41, that is, the knee of the curve, is most important to the operation of my invention, for over this region the slope of the characteristic curve changes with the applied magnetomotive force. This will be explained in detail later.

Figure 4:
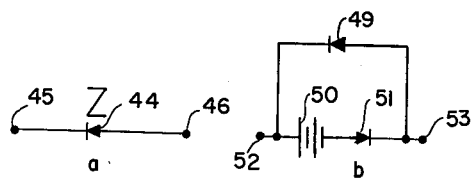
FIGURES 4a and 4b show the symbol for a Zener diode and an equivalent circuit thereof, respectively.

In order to understand the operation of my invention it is necessary to understand the operation of the Zener diodes used therein. FIGURE 4a shows a Zener diode 44 connected between terminals 45 and 46, and FIGURE 4b, which is equivalent to FIGURE 4a, consists of a voltage source 50 and an ordinary diode 51 connected in series between terminals 52 and 53 and also another ordinary diode 49 connected in parallel to 50 and 51 between terminals 52 and 53 with the anode end connected to terminal 53. When the source of voltage (not shown) is connected across terminals 52 and 53 with its positive terminal connected to terminal 52, no current can flow in the circuit until this applied source of voltage exceeds the voltage of source 50. At that point, current flows through the circuit of FIGURE 4b from terminal 52 to terminal 53; the magnitude of the current depends upon how much the applied voltage exceeds the voltage of source 50 and also depends upon the impedance of the circuit. Zener diode 44 behaves in a manner similar to the circuit of FIGURE 4b. With a source of voltage connected between terminals 45 and 46 where terminal 45 is positive, current can flow from terminal 45 through Zener diode 44 to terminal 46 only when the applied voltage exceeds a certain critical value referred to as the Zener voltage of Zener diode 44. If a positive voltage were connected to terminal 53 or 46 the reaction would be the same as if a positive voltage were applied to the anode of an ordinary diode. The Zener voltage, then, is equivalent to the value of voltage source 50 in FIGURE 4.

Figure 5:
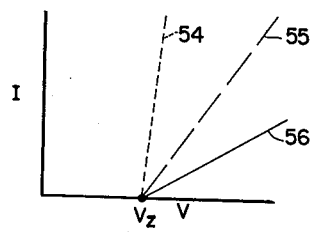
FIGURE 5 is a graph of voltage versus current characteristics of three resistance Zener diode arrangements.

FIGURE 5 is a voltage versus current graph of a simple series circuit comprising a voltage source having the voltage V, a Zener diode having a Zener voltage $V_z$ and an impedance. A dotted straight line curve 54 depicts the voltage current relationship in such a circuit where the value of the impedance is small, a dashed straight line curve 55 depicts the same relationship where the impedance is larger, and a solid straight line curve 56 depicts the relationship where the impedance is still larger. It is seen that when the voltage V is smaller than the Zener voltage $V_z$, no current flows in the circuit, and when voltage V exceeds $V_z$, the current flowing in the circuit depends upon the circuit impedance and the voltage V. When voltage V just equals $V_z$ no current flows, but a further increase in voltage V causes current flow.

Returning now to FIGURE 1, an alternating current source or voltage is applied across terminals 21 and 22, a direct current control signal is applied across terminals 24 and 25. Bias winding 16 and bias power source 23 are arranged to bias core 10 to a point near the center of the knee of the magnetic material's characteristic curve. Such a point is identified by numeral 60 in FIGURE 3. Output winding 11 has a given impedance at this magnetic operating point, and the A.C. impedance of winding 11 may be increased or decreased by decreasing or increasing, respectively, the degree of saturation of core 10. In other words, the self inductance of winding 11, and thus its A.C. impedance, varies inversely with the degree of saturation of core 10. Since winding 11 and output impedance 17 are connected in series across input terminals 21 and 22, current flowing through impedance 17 depends upon the impedance of winding 11. Thus, when core 10 is fully saturated the current flowing through winding 11 and impedance 17 is a maximum value and the voltage appearing across output terminals 20 and 21 is a maximum also. Likewise, when core 10 is completely unsaturated, the current flowing through winding 11 and impedance 17 is a minimum, and the voltage across output terminals 20 and 21 is also a minimum. The scheme by which the degree of saturation of core 10 is varied in accordance with an input signal across terminals 24 and 25 will now be explained.

With a source (not shown) of unidirectional control signal having its positive side connected to terminal 25 and its negative side connected to terminal 24, it is seen from the discussion above, of the Zener diode operation, that no current will flow through any of the Zener diodes 27, 31, 33, and 35 until their Zener voltage has been reached by the signal source. Assuming a given Zener voltage for Zener diode 35, a higher Zener voltage for Zener diode 33, still a higher Zener voltage for Zener diode 31 and an even higher Zener voltage for Zener diode 27, these Zener diodes will become conductive in this same order with increasing signal voltage. When the Zener voltage of Zener diode 35 is reached a current may flow from terminal 25 through Zener diode 35, resistor 34, control winding 15, and back to terminal 24. This current will change the degree of saturation of core 10, and consequently will change the output voltage across terminals 20 and 21. For the winding direction shown for winding 15, the current will increase the saturation of core 10 and therefore will increase the output voltage across terminals 20 and 21. Further increase in the control signal voltage across terminals 24 and 25, of course, increases the current flowing through control winding 15. When the control signal voltage reaches the Zener voltage of diode 33, it too becomes conductive and allows current to flow through control winding 14. The magnetomotive force due to the currents flowing in the control windings 14 and 15 are additive due to the similar winding directions, so that core 10 becomes saturated at an even greater extent with further increases in the control signal voltage. This, of course, causes the output voltage across terminals 20 and 21 to increase with increases in control signal voltage at a faster rate than when control current flowed only through control winding 15. When a control signal voltage reaches a value of the Zener voltage of Zener diode 31, Zener diode 31 becomes conductive and further increases in signal voltage cause current to flow through control winding 13. It will be noted that control winding 13 is wound in a sense opposite that of control windings 14 and 15. Consequently, the magnetomotive force produced by current flowing through control winding 13 must be subtracted from the magnetomotive forces due to currents in control windings 14 and 15 to obtain the net result upon core 10. Likewise, when a control signal voltage reaches the Zener voltage of Zener diode 27, Zener diode 27 becomes conductive and allows current to flow through control winding 12 upon further increase in the signal voltage. Winding 12 has the same winding sense as winding 13, and therefore they tend to buck out the magnetomotive force of control windings 14 and 15. Therefore, it is seen that, with an increasing control signal voltage across terminals 24 and 25, the output voltage across terminals 20 and 21 remains constant until Zener diode 35 becomes conductive. At this point the output voltage increases, and when Zener diode 33 becomes conductive the output voltage increases at an even greater extent. The magnitude of the output voltage is reduced when Zener diode 27 becomes conductive.

Figure 6:
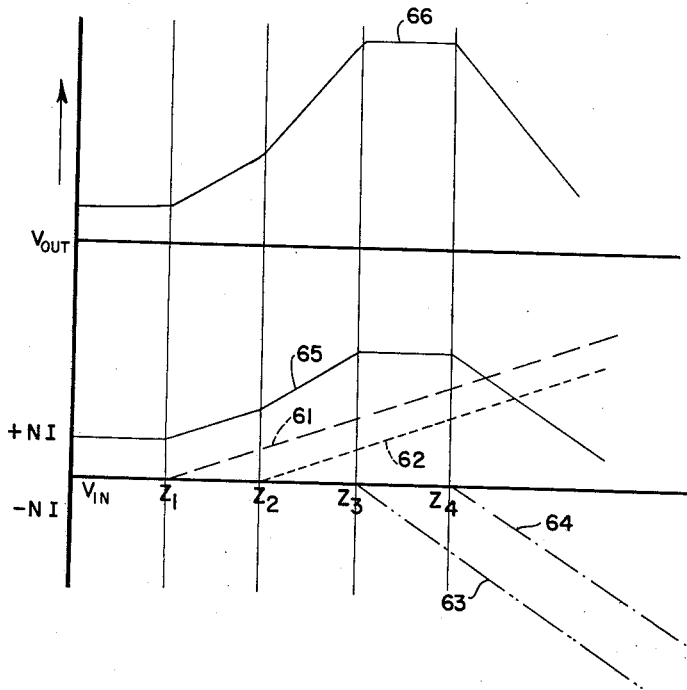
FIGURE 6 is a graph showing certain voltage, current, and magnetomotive force relationships in the circuit of FIGURE 1.

To obtain a clearer picture of this operation, reference is now made to FIGURE 6. In FIGURE 6, curve 61 represents the M.M.F. (magnetomotive force) caused by current flowing through control winding 15, curve 62 represents the M.M.F. caused by current flowing through control winding 14, curve 63 represents the M.M.F. caused by current flowing through control winding 13, and curve 64 represents the M.M.F. caused by current flowing through control winding 12. Curve 65 represents the total, or net, M.M.F. acting upon core 10, and is the summation of the M.M.F.'s due to currents in control windings 12, 13, 14 and 15. Also shown in the graph of FIGURE 6 is a curve 66, which represents the output voltage across terminals 20 and 21 of FIGURE 1. In FIGURE 6 the abscissa represents the control signal voltage applied to terminals 24 and 25, the ordinate for curve 61, 62, 63, 64, and 65 represents M.M.F., or ampere turns, and the ordinate for curve 66 represents voltage. The symbols $Z_1$, $Z_2$, $Z_3$, and $Z_4$ on the axis of abscissas represent the Zener voltages of Zener diodes 35, 33, 31, and 27, respectively.

It will be noted in FIGURE 6 that the net M.M.F., curve 65, stays constant, as does the output voltage, curve 66, until the signal voltage, $V_{in}$ reaches a value $Z_1$. At this point M.M.F. increases due to current flowing through winding 15, and the output voltage increases. Where $V_{in}$ reaches $Z_2$, current flows through winding 14, and the M.M.F. increases as does the output voltage. When $V_{in}$ reaches $V_3$, current flows through winding 13, and its opposite M.M.F. as shown by curve 63 causes the net M.M.F., curve 65, to become fairly constant, as does the output voltage. The net M.M.F. and the output voltage likewise decrease when $V_{in}$ reaches a value $Z_4$, where the M.M.F. of winding 12 represented by curve 64, further subtracts from the M.M.F. impressed upon core 10. With a given signal input voltage then, the output voltage may be made to increase and decrease as desired by selecting control windings and Zener diodes as needed. The size of the resistors in series with the control windings and Zener diodes, of course, also must be taken into account, for they control the rate of current increase through the control windings with increase in signal input voltage. Thus, a desired output curve may be obtained by considering the characteristic curve of the magnetic material of the core, the sense and number of turns on the control windings to be used, the Zener voltages of the Zener diodes, and the amount of resistance in series with the Zener diode and control winding for each portion of the control circuit.

It is seen that devices incorporating my invention may be designed to produce any kind of characterization, that is, variation of output signal with control signal, that is desired. It is not limited to increasing output voltages, but may produce output voltages that fluctuate in any desired fashion with the control voltage. It therefore produces the result desired in an admirably versatile manner.

Figure 2:
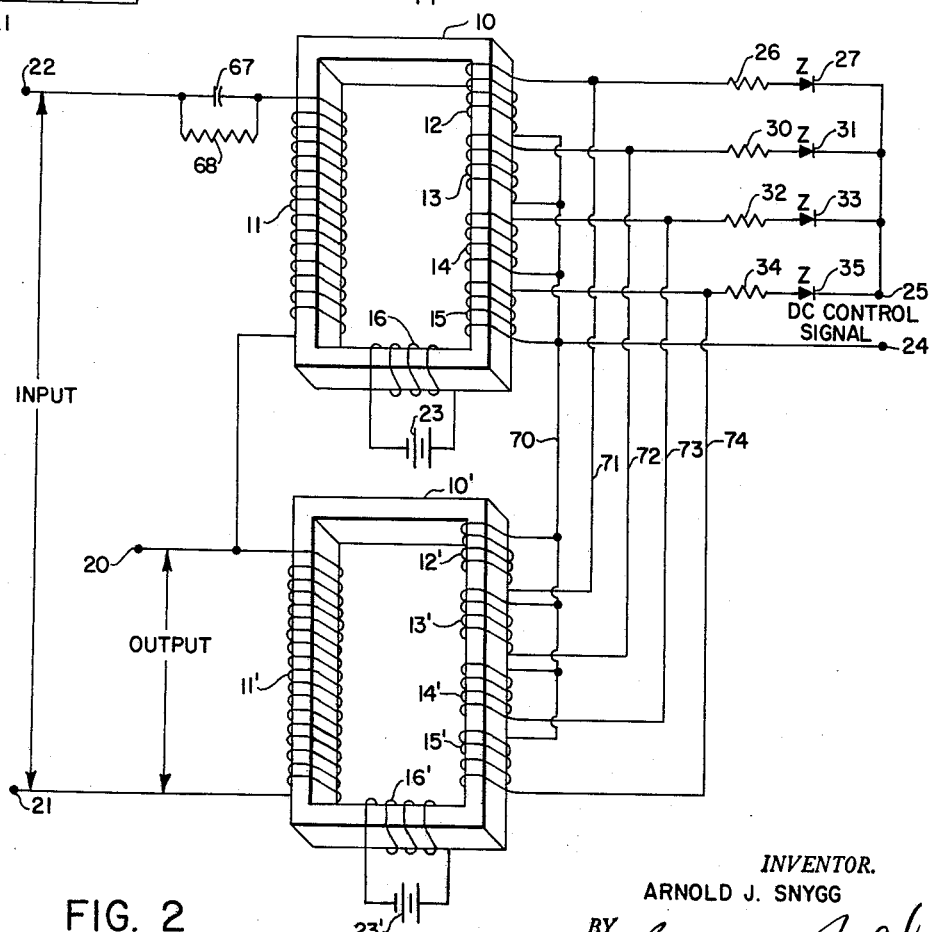
FIGURE 2 is a circuit of a signal characterizer embodying my invention and arranged to minimize phase shift in the output signal.

Structure of FIGURE 2

The circuit of FIGURE 2 is, in part, the same as the circuit of FIGURE 1, and those portions that are identical with portions of FIGURE 1 are designated by the same numerals. In addition to the components of FIGURE 1, the circuit of FIGURE 2 includes a capacitor 67 connected between terminal 22 and the upper end of output winding 11. Across capacitor 67 is connected a resistor 68. A second magnetic core 10' has wound on it an output winding 11', which is connected between terminals 20 and 21 in place of resistor 17 in FIGURE 1. Core 10' also has control winding 12', 13', 14' and 15', each of which is connected in parallel to the corresponding windings 12, 13, 14, and 15 of core 10. Control windings 12', 13', 14' and 15' are connected to have the opposite magnetic effect upon core 10' that their corresponding windings 12, 13, 14 and 15 have on core 10. Thus, the upper ends of windings 12', 13', 14' and 15' are connected to the lower ends of windings 12, 13, 14, and 15. The lower end of winding 12' is connected by a conductor 71 to the upper end of winding 12, the lower end of winding 13' is connected to the upper end of winding 13 by conductor 72, the lower end of winding 14' is connected through conductor 73 to the upper end of winding 14, and the lower end of winding 15' is connected through conductor 74 to the upper end of winding 15.

Core 10' also has a bias winding 16' that is connected across a source of bias current 23'.

Operation of FIGURE 2

The operation of the circuit of FIGURE 2 is very similar to the operation of the circuit of FIGURE 1, the main difference being that instead of resistor 17 being connected in series with coil 11, as in FIGURE 1, the circuit of FIGURE 2 has an output winding 11' connected in that position. Further, the control windings of cores 10 and 10' of FIGURE 2 are connected in such a manner that an increase in saturation of core 10 is accompanied by a decrease in saturation of core 10', and vice versa. It will be noted that with such an arrangement the total reactive impedance across the series combination of windings 11 and 11' remains substantially constant regardless of the control signal input applied to terminals 24 and 25, for as the impedance of one of output windings 11 and 11' increases, impedance of the other decreases, and vice versa. Thus, the current flowing through these windings maintains a substantially constant phase relationship with the applied signal. This also changes the output voltage over a greater range for a given control signal. This was not the case in the circuit of FIGURE 1, where a change in impedance of output winding 11 changed the phase angle of the voltage across output terminals 20 and 21 with respect to the applied voltage across terminals 21 and 22. In FIGURE 2, the addition of the parallel combination of capacitor 67 and resistor 68 in series with terminal 22 and the upper end of winding 11 is shown not because it is essential to the invention, but because it may be very useful. The purpose of capacitor 67 and resistor 68 is to obtain the desired phase of the output voltage across terminals 20 and 21, with respect to the input voltage across terminals 22 and 21.

As with the circuit of FIGURE 1, the circuit of FIGURE 2 may be modified with respect to control windings, Zener diodes, and series resistors (such as resistors 26, 30, 32, and 34) to obtain practically any desired relation between the output voltage and the input signal voltage.

While I have shown certain specific embodiments of my invention, they are for the purpose of illustration only and my invention is to be limited solely by the scope of the appended claims.

I claim:

1. Function generating means comprising: saturable magnetic reactor means having first winding means adapted to be excited by an alternating voltage; a plurality of control winding means responsive to changing unidirectional signal voltages and connected to said magnetic reactor means for changing the operating characteristics thereof; a plurality of Zener diode means responsive to a control signal and connected to said plurality of control winding means for controlling the voltages applied to said control winding means; and output circuit means connected to said first winding means and responsive to variations of reactance of said magnetic reactor means for producing output signals.

2. Function generating means comprising: saturable magnetic reactor means having first winding means adapted to be excited by an alternating voltage; biasing means responsive to a constant voltage and connected to said magnetic reactor means for changing the operating characteristics thereof; a plurality of control winding means responsive to changing unidirectional signal voltages and connected to said magnetic reactor means for further changing the operating characteristics thereof; a plurality of Zener diode means responsive to a control signal and connected to said plurality of control winding means for controlling the voltages applied to said control winding means; and output circuit means connected to said first winding means and responsive to variations of reactance of said magnetic reactor means for producing output signals.

3. Function generating means comprising: saturable magnetic reactor means having first winding means adapted to be excited by an alternating voltage; biasing means responsive to a constant voltage and connected to said magnetic reactor means for changing the operating characteristics thereof; a plurality of control winding means responsive to changing unidirectional signal voltages and connected to said magnetic reactor means for further changing the operating characteristics thereof; a plurality of switching means responsive to a control signal, one of said plurality of switching means being connected to each of said plurality of control winding means for controlling the voltages applied to said plurality of control winding means; and output circuit means connected to said magnetic reactor winding means and responsive to variations of reactance of said magnetic reactor means for producing output signals.

4. Electric signal characterizing apparatus comprising: first and second saturable magnetic cores; first and second output windings respectively associated with said first and second cores; a pair of alternating voltage terminals; means connecting said output windings in series relation across said alternating voltage terminals; a plurality of control windings associated with said first core; a like plurality of control windings associated with said second core and corresponding to the control windings of said first core; a like plurality of Zener diodes; first and second control signal input terminals; means severally connecting said Zener diodes between said first control signal input terminal and first ends of the control windings of said first core; means connecting the other ends of the control windings of said first core to said second control signal input terminal; and means interconnecting each of the control windings of said second core with the corresponding control winding of said first core so that the control windings of said first and second cores produce opposite magnetic effects on their respective cores.

5. Electric signal characterizing apparatus comprising: a saturable magnetic core; an output winding coupled to said core; impedance means connected in series relation with said output winding; means for applying an alternating voltage across the series combination of said output winding and said impedance means; means for obtaining an output signal across said impedance means; bias winding means coupled to said core to bias said core to a desired magnetic operating point; a plurality of control windings coupled to said core; a corresponding Zener diode for each one of said control windings; first and second control signal input terminals; means connecting said Zener diodes from said first control signal input terminal to one end of each of the corresponding control windings; and means connecting the other ends of said control winding to said second control signal input terminal.

6. Electric signal characterizing apparatus comprising: a saturable magnetic core; an output winding coupled to said core; impedance means connected in series relation with said output winding; means for applying an alternating voltage across the series combination of said output winding and said impedance means; means for obtaining an output signal across said impedance means; bias winding means coupled to said core to bias said core to a desired magnetic operating point; a plurality of control windings coupled to said core; a corresponding asymmetrical reference potential means for each one of said control windings; first and second control signal input terminals; means connecting said asymmetrical reference potential means from said first control signal input terminal to one end of each of the corresponding control windings; and means connecting the other ends of said control winding to said second control signal input terminal.

7. Electric signal characterizing apparatus comprising: a saturable magnetic core; an output winding coupled to said core; impedance means connected in series relation with said output winding; means for applying an alternating voltage across the series combination of said output winding and said impedance means; means for obtaining an output signal across said impedance means; a plurality of control windings coupled to said core; a corresponding Zener diode for each one of said control windings; first and second control signal input terminals; means connecting said Zener diodes from said first control signal input terminal to one end of each of the corresponding control windings; and means connecting the other ends of said control winding to said second control signal input terminal.

8. Electric signal characterizing apparatus comprising: a saturable magnetic core; an output winding coupled to said core; impedance means connected in series relation with said output winding; means for applying an alternating voltage across the series combination of said output winding and said impedance means; means for obtaining an output signal across a plurality of control windings coupled to said core; a corresponding asymmetrical reference potential means for each one of said control windings; first and second control signal input terminals; means connecting said asymmetrical reference potential means from said first control signal input terminal to one end of each of the corresponding control windings; and means connecting the other ends of said control winding to said second control signal input terminal.

References Cited in the file of this patent

UNITED STATES PATENTS

| | | |
|---|---|---|
| 2,556,200 | Lesti | June 12, 1951 |
| 2,697,201 | Harder | Dec. 14, 1954 |
| 2,719,261 | Bradley et al. | Sept. 27, 1955 |
| 2,769,137 | Creusere | Oct. 30, 1956 |
| 2,801,383 | Comins et al. | July 30, 1957 |
| 2,809,341 | Silver | Oct. 8, 1957 |
| 2,949,237 | De Wilde | Aug. 16, 1960 |